(No Model.)
E. P. PEACOCK.
LETTER FILE.
No. 565,864. Patented Aug. 11, 1896.
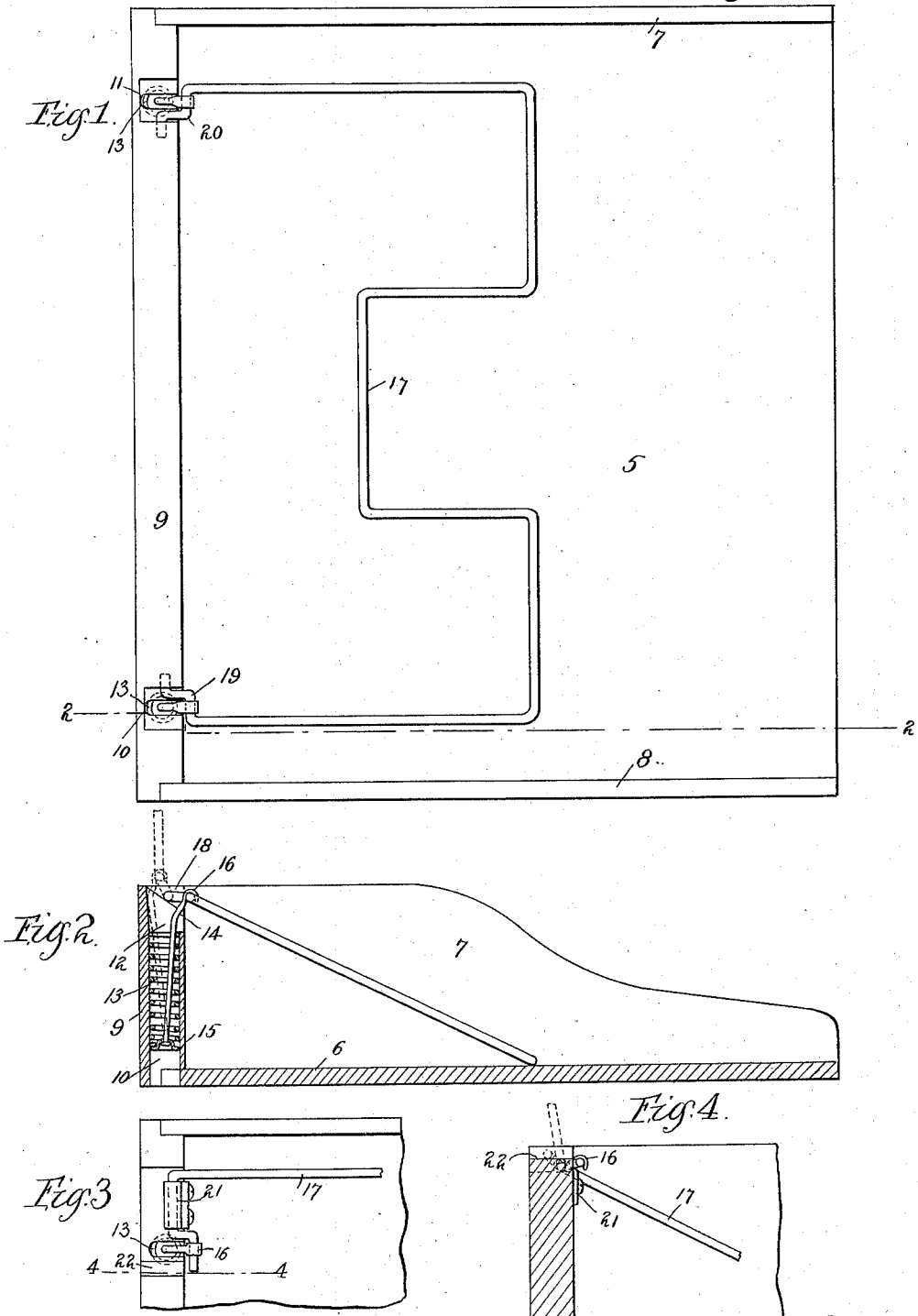
Witnesses.
Wm. M. Rheem.
Holmes A. Tilden.
Inventor
Elijah P. Peacock,
by Bond Adams Pickard Jackson
Att'ys.

UNITED STATES PATENT OFFICE.

ELIJAH P. PEACOCK, OF CHICAGO, ILLINOIS, ASSIGNOR TO THE AMBERG FILE AND INDEX COMPANY, OF SAME PLACE.

LETTER-FILE.

SPECIFICATION forming part of Letters Patent No. 565,864, dated August 11, 1896.

Application filed February 8, 1896. Serial No. 578,609. (No model.)

*To all whom it may concern:*

Be it known that I, ELIJAH P. PEACOCK, a citizen of the United States, residing at Chicago, in the county of Cook and State of Illinois, have invented certain new and useful Improvements in Letter-Files, of which the following is a specification, reference being had to the accompanying drawings, in which—

Figure 1 is a plan view. Fig. 2 is a vertical section on line 2 2 of Fig. 1. Fig. 3 is a detail, being a partial plan view, showing a modification; and Fig. 4 is a vertical section on line 4 4 of Fig. 3.

My invention relates to letter-files or temporary binders, and particularly to that class of binders in which a suitable case is provided with a series of index-sheets between which the material to be filed is inserted, said index-sheets being held down by a spring-bail, one form of such file or binder being shown in patent to Louder, No. 395,158, dated December 25, 1888.

The object of my invention is to provide certain improvements in binders of this class by which they may be more cheaply constructed and will be more durable as well as more efficient. I accomplish this object as hereinafter specified and as illustrated in the drawings.

That which I regard as my invention will be set forth in the claims.

In the drawings, 5 indicates the file, of which 6 is the bottom, 7 8 the sides, and 9 the back. In the back, near its ends, are provided recesses or sockets 10 11 formed by boring up into the back from below, such sockets terminating a short distance below the upper edge of the back, forming shoulders 12, as shown in Fig. 2.

13 indicates springs, one of which is placed in each of the sockets 10 11, being inserted from below, their upper ends bearing against the shoulders 12, which form stops for them.

14 indicates rods, which pass down through the springs 13, and are provided at their lower ends with caps 15, adapted to support the springs, as shown in Fig. 2. The upper ends of the rods 14 pass through suitable passages in the back of the file and are provided with hooks 16, by which they are connected to the bail 17. That portion of the bail which bears upon the index-sheets is of any suitable form, and its ends are pivoted to the back 9 by inserting the ends of the bail in suitable sockets in the back, formed by channeling out a portion of the back, as shown at 18 in Fig. 3, thus providing vertical portions into which the ends of the bail may be inserted after being bent at an angle, as shown. This construction is such that the bail may be very readily put in place, as its ends may be sprung slightly apart and then fitted into their respective sockets, where they will be retained by the spring of the bail. The hooks 16 are secured to the bail by means of shoulders 19 20, formed by bending the ends of the bail at right angles, as shown in Fig. 1.

When the bail is raised for the purpose of permitting access to the index-sheets, the rods 14 will also be raised, thereby compressing the springs 13. When the bail is raised to a vertical position, the shoulders 16 will move back of the pivots of the bail, the result being that the springs will tend to hold the bail in its upright position. The back of the file-case serves as a stop to prevent excessive backward movement of the bail. By this construction the springs 13 not only serve to hold the bail 17 yieldingly in contact with the index-sheets, but also hold its ends more firmly in their sockets, preventing them from becoming displaced.

The construction above described is a very simple and effective one, the parts being assembled without the use of screws, and there being practically no wear upon any of the parts. They may also be very readily assembled, as all that is necessary is to slip the ends of the bail into their sockets and insert the springs with the retaining-rods and hook the ends of the rods over the shoulders of the bail.

In Figs. 3 and 4 I have shown a modified construction by which the same arrangement of springs is utilized with a different mounting for the bail. In the construction shown in Figs. 3 and 4 the ends of the bail 17 are fitted in bearings 21, secured to the back by screws or other suitable means, and the ends of the rods 14 are hooked over the ends of the bail, which are bent into a suitable position, as shown in Fig. 3. Ledges 22 are provided opposite the ends of the bail to form stops to limit the backward movement of the bail, as shown in Fig. 4.

I do not wish to limit myself to the specific details of the construction illustrated and described, as many modifications may be made without departing from the spirit of my invention.

That which I claim as my invention, and desire to secure by Letters Patent, is—

1. In a file, the combination with a case the back of which is provided with a spring-socket open from below, of a spring in said socket, and a bail connected to the spring, substantially as described.

2. In a file, the combination with a case having a back, and a spring, of a spring-receiving socket, a stop which resists upward movement of the spring, a bail, and a connecting device connected to said bail and to said spring whereby when said bail is raised upward pressure will be applied to said spring, substantially as described.

3. In a file, the combination with a case, of a bail having its ends pivoted directly to the back of the case and having shoulders 19 20, springs 13, and rods 14 connected to said springs and adapted to be connected to said shoulders, substantially as described.

4. In a file, the combination with a case having a back, and a socket in said back, of a spring fitted into said socket, a stop for the upper end of said spring, a rod adapted to support the lower end of said spring, and a bail to which said rod is connected, substantially as described.

5. In a file, the combination with a case having a back, and a socket in said back, of a shoulder 12 at the upper end of said socket, a spring adapted to be fitted into said socket from below, a rod 14 having a cap to support the lower end of said spring, and a bail to which said rod is connected, substantially as described.

6. In a file, the combination with a case having a back, and sockets in said back, of shoulders 12 at the upper ends of said sockets, springs adapted to be fitted into said sockets from below, rods 14 having caps to support the lower ends of said springs, and a bail having its ends bent and pivoted to the back and having shoulders 19 20 to which said rods are connected, substantially as described.

7. In a file, the combination with a case having a back, of a bail pivoted to said case, a spring, a stop for the end of the spring nearest said bail, and a device connecting the opposite end of said spring with said bail, whereby when said bail is lifted the spring will be compressed, substantially as described.

ELIJAH P. PEACOCK.

Witnesses:
ALBERT H. ADAMS,
THEODORE J. AMBERG.